United States Patent
Fischer et al.

(10) Patent No.: US 7,447,431 B2
(45) Date of Patent: Nov. 4, 2008

(54) OPTICAL COMMUNICATIONS PROCESSING SYSTEM, COMPONENTS AND OPERATING METHOD THEREOF

(75) Inventors: Jurgen Fischer, Backnang (DE); Willi Wolf, Backnang (DE)

(73) Assignee: Ericsson AB, Stockholm (SE)

( * ) Notice: Subject to any disclaimer, the term of this patent is extended or adjusted under 35 U.S.C. 154(b) by 485 days.

(21) Appl. No.: 10/530,596

(22) PCT Filed: Oct. 6, 2003

(86) PCT No.: PCT/IB03/04996

§ 371 (c)(1),
(2), (4) Date: Apr. 6, 2005

(87) PCT Pub. No.: WO2004/032382

PCT Pub. Date: Apr. 15, 2004

(65) Prior Publication Data

US 2006/0013582 A1 Jan. 19, 2006

(30) Foreign Application Priority Data

Oct. 7, 2002 (DE) ................................ 102 46 612

(51) Int. Cl.
*H04B 10/08* (2006.01)
(52) U.S. Cl. ................................ 398/16; 398/17; 398/33
(58) Field of Classification Search ............. 398/15–17, 398/30–33, 151, 154, 182, 192, 194, 200, 398/202
See application file for complete search history.

(56) References Cited

U.S. PATENT DOCUMENTS

| 4,994,675 | A | | 2/1991 | Levin et al. |
| 5,136,410 | A | * | 8/1992 | Heiling et al. ................. 398/15 |
| 5,559,624 | A | * | 9/1996 | Darcie et al. .................. 398/72 |
| 5,966,206 | A | | 10/1999 | Jander |
| 6,243,195 | B1 | * | 6/2001 | Pedersen et al. ................ 398/9 |
| 6,870,863 | B1 | * | 3/2005 | Butler et al. ........... 372/29.014 |
| 7,076,176 | B2 | * | 7/2006 | Tsuchiya ..................... 398/202 |

FOREIGN PATENT DOCUMENTS

| DE | 31 47 555 A1 | 6/1983 |
| DE | 100 58 776 C1 | 8/2002 |
| EP | 0 599 155 A1 | 11/1993 |
| EP | 0 981 212 A1 | 2/2000 |
| WO | WO 99/48229 | 12/1998 |

* cited by examiner

*Primary Examiner*—Dalzid Singh
(74) *Attorney, Agent, or Firm*—Kirschstein, et al.

(57) ABSTRACT

An optical information transmission system comprises a plurality of optical transmitters and receivers, each having ports for exchangeable waveguides. Each transmitter has an input for receiving an enable signal assigned to it, and is adapted to generate or not to generate an optical information signal according to the status of the enable signal. A signal generator generates the enable signal whose status indicates whether the receiver is connected via a waveguide to a transmitter or not. Each signal generator is connected to one enable input by an enable control line wired separately from the waveguides and is adapted to generate the enable signal only after a test signal specific for each receiver has been received at its waveguide port. A description of the specific test signal of a receiver is transmitted to the associated transmitter.

18 Claims, 3 Drawing Sheets

OPTICAL COMMUNICATIONS PROCESSING SYSTEM, COMPONENTS AND OPERATING METHOD THEREOF

The present invention relates to an optical information processing system having a plurality of optical transmitters and receivers that have ports for interchangeable waveguides, to these transmitters and receivers, and to a method for operating these. In operation, the transmitters of such systems generate intensive, mostly coherent radiation, which must not escape into free space since it can lead to eye injury.

Safety devices have been developed which are to prevent emission of an information signal from such a transmitter if it is not connected to a receiver by a waveguide. It is e.g. known to interconnect transmitters and receivers of such a system by hybrid cables that comprise a waveguide for the transmission of the information signal, on the one hand, and an enable signal line, on the other, by which an enable signal can be transmitted from the receiver to the transmitter that indicates to the latter that it is connected to the receiver. Safety circuits at the receiver ensure that the latter generates the information signal only if the enable signal is present.

In this way, an uncontrolled emission of the information signal into free space can be prevented, but the wiring of such a system is laborious and error-prone if a huge number of transmitters and receivers must be interconnected. Moreover, hybrid cables and their connectors are more complicated, more expensive and also more delicate than simple, purely optical cables. It would therefore be desirable to be able to avoid the use of hybrid cables in an optical information transmission system. However, if the waveguides and the enable signal lines are wired independently from one another between the transmitters and receivers of the data transmission system, erroneous associations may easily occur, in which a receiver is connected by an optical cable to a transmitter to which it should not be connected and to which its enable signal line is not connected. If the receiver delivers an enable signal in such a situation, emission of the information signal is enabled at another transmitter, which, then, might emit into free space.

The object of the present invention is to provide an information transmission system, a transmitter and a receiver for an information transmission system and a method for suppressing unwanted emission in such a system, which provide effective protection even when waveguides and enable signal lines are wired independently from one another.

The object is achieved by an information transmission system according to claim 1, a transmitter according to claim 14, a receiver according to claim 15 and a method for suppressing unwanted emission according to claim 16.

By transmitting a coded test signal, i.e. a test signal which is specific for each receiver, before enabling the information signal, it can be ascertained without doubt whether the transmitter and receiver coupled by a waveguide are indeed assigned to each other. Only in this case the information signal is enabled.

It is conceivable to provide at each transmitter a memory for storing a description of the specific test signal of the assigned receiver. However, the system is easier to realize, if, instead, means are provided for transmitting a description of the specific test signal of a receiver from the receiver to the assigned transmitter. Preferably, this means is the enable control line itself; in this way, wiring errors of the enable control lines can be excluded.

In a first embodiment of the invention, each receiver has a memory for the description of its test signal assigned to it. This memory, which is preferably directly integrated into the receiver, can have a value pre-stored in it by the manufacturer of the system, which is unique in that system. However, it is easier to enlarge the system by additional transmitters if the stored description is unique not only within the system but for all receivers produced by the manufacturer or compatible therewith. The huge bit number required therefore increases the time needed for carrying out the method of the invention. This can be avoided if the descriptions of the test signals are not permanently predefined but are assigned dynamically and in a unique way by a central unit of the system.

A second embodiment uses a random generator for randomly producing a description of the test signal for each receiver.

According to a third embodiment, the uniqueness of the test signals can be guaranteed by having a central unit assign an instant to each receiver at which it may demand transmission of the test signal from the assigned transmitter.

A particularly simple description of the test signal is a digital number, from which the test signal can be generated simply by coding the number in an optical signal according to any coding method, and which is transmitted in appropriately coded form in the waveguide. Another possibility is that the description of the test signal defines a plurality of instants at which the test signal changes its level.

For transmitting the enable control signal and the description of the test signal on the enable control line it is sufficient if this line can assume two levels. One of these, when continuously applied, corresponds to the enable signal; while transmitting the description of the test signal, the enable control line must not assume this second level continuously for such a long time that this may be regarded as the enable signal by the transmitter. Evidently, another possibility is that the enable signal level on the enable control line is different from the at least two levels used for transmitting the description.

For safety reasons, each transmitter should transmit the test signal with less average power than the information signal. This may e.g. be achieved by forming the test signal from short pulses with long time intervals in between, wherein the energy of the pulses is not sufficient to cause eye injury. According to a preferred embodiment, the test signal is incoherent and therefore harmless to the eye, whereas the information signal has the coherency required for achieving high transmission rates.

This may easily be achieved using a transmitter of a two-stage design with a laser and an amplifier located between the laser and the waveguide port. If the laser is operable only in the presence of the enable signal, only incoherent spontaneous emission of the amplifier can be generated as the test signal.

A preferred application of the invention are optical switching systems for telecommunications, in which the transmitters and receivers are located on a circuit board mounted on a backplane, and the enable control lines extend along the backplane.

Further features and advantages of the invention become apparent from the subsequent description of embodiments referring to the appended figures.

Figure 1:
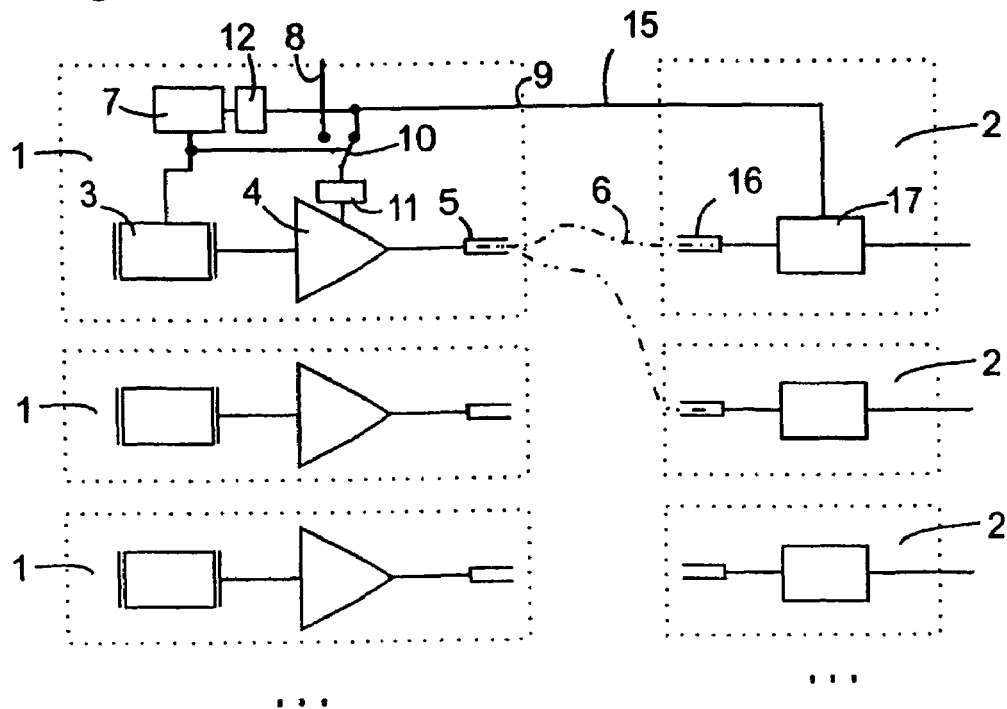
FIG. 1 is a schematic representation of an optical switching system comprising a plurality of transmitters and receivers according to the present invention.

FIG. 1 schematically shows a set-up of several optical transmitters 1 and receivers 2 in an optical switching station of a telecommunication network. The transmitters 1 and receivers 2 are located on circuit boards that are mounted on a common backplane. They all have an identical structure which is shown in the Figure in detail only for one transmitter 1 and one receiver 2.

The optical components of each transmitter 1 are a laser resonator 3, in particular a laser diode, an optical amplifier 4 integrated on a common semi-conductor substrate with the laser diode 3, through which a waveguide extends from the laser diode 3 to an optical output port 5 of the transmitter 1. The optical output port 5 is a connector, which is engageable with a complementary connector of an optical connecting cable 6.

The transmitter has an input 8 for an electrical information signal and in input 9 for an enable signal. The two inputs are alternatively connected by a switch 10 to a control input of a driver circuit 11, which controls the energy supply to the optical amplifier 4. The enable signal input 9 is further connected via a delay circuit 12 to a control input of a of a driver circuit 7 which controls the power supply of the laser diode 3.

At the enable signal input 9, two different signal levels, referred to as 0 and 1, may be applied. In the shown position of the switch 10, these levels control the power supply of the optical amplifier 4 via the driver circuit 11. The delay circuit 12 is designed to apply a level of 0 to the driver circuit 7 in an initial phase of operation and to switch over to level 1 only if this level has been applied continuously to its input during a predefined time interval T. While the delay circuit provides 0 output level, the laser diode 3 remains off. When the laser diode 3 is off but the optical amplifier 4 is powered, only incoherent light from spontaneous emission of the amplifier 4 can appear at the optical output port 5 of the transmitter. This spontaneous emission can take two different power levels, according to a signal level 0 or 1 at the enable signal input 9.

The signal levels applied to enable signal input 9 are generated by a receiver 2 associated to the transmitter 1 and connected to it by an enable signal line 15. This enable signal line 15 is formed by a line on the backplane connecting transmitters 1 and receivers 2.

Figure 2:
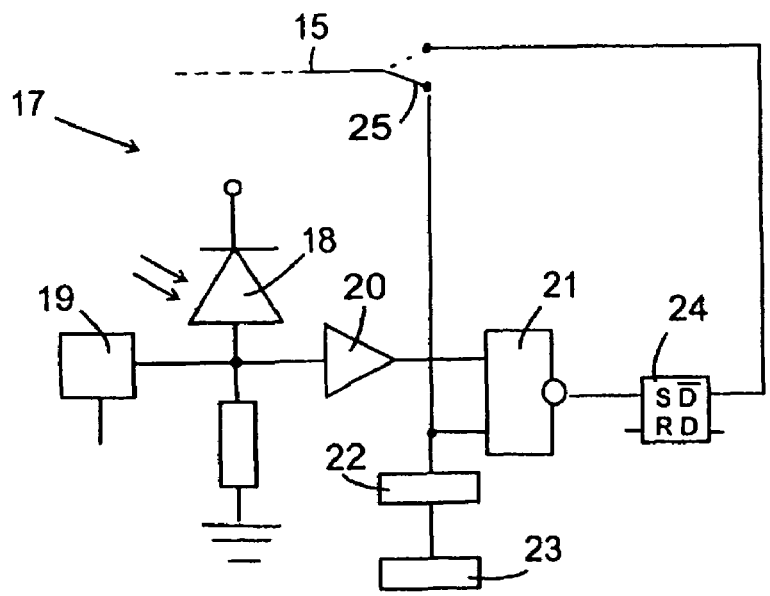
FIG. 2 is a schematic representation of a receiver of such a system according to a first embodiment.

Each receiver 2 has an optical input port 16 to which an optical transmission cable 6 may be connected, and an evaluation circuit 17. A first example for the structure of this evaluation circuit is given in FIG. 2.

A photo diode 18 of evaluation circuit 17 receives a light signal incident at optical input port 16 and transforms it into an electrical signal. A decoder circuit 19 connected to photo diode 18 for extracting and decoding an information signal that may be modulated onto the incident light signal is known and will not be further described. The photo diode 18 further has an amplifier 20 connected to it, which is designed to provide an output level of 0 when a weak incoherent light signal is incident that corresponds operation of the optical amplifier 4 at an input level 0 of its driver circuit and to provide an output level of 1 upon incidence of a strong incoherent signal that corresponds to operation of the optical amplifier at an input level 1 of its driver circuit 11. The output of this amplifier 20 is connected to an input of a NOR gate 21. The second input of the NOR gate 21 is connected to a parallel-serial converter 22, which, in turn, is connected to a register 23. This converter 22 is triggered by an increase of the light power detected by the photo diode 18, as will occur when a connection is formed by an optical transmission cable 6 between the photo diode 18 and a transmitter 1 outputting spontaneous emission at low power. I.e. if a connection has been formed by the transmission cable 6 between the receiver 2 and an arbitrary transmitter 1, or in an initial power-up phase of the switching station, the converter 22 begins to serialize the data recorded in register 23 at a given, low frequency. This frequency may be in the range of several Hz to several kHz, at maximum. It is selected so that the serialization of the complete data recorded in the register takes no longer than the delay interval T of the delay circuit 12. The serialized data thus reaches the second input of NOR gate 21 and is simultaneously applied to enable signal line 15. In this way, the serialized data controls the strength of the spontaneous emission in the optical amplifier 4 of the transmitter that is connected to the receiver 2 by the enable signal line 15. If this same transmitter is connected to the receiver 2 by the optical transmission cable 6, the output signal of the amplifier 20 will be identical to that of the parallel-serial converter 22, except for propagation delays, and the output signal of NOR gate 21 is constantly 0. An RS flip-flop 24 connected to the output of NOR gate 21 is not set, and its $\overline{D}$ output remains constant at 1. When the serialization is finished, a switch 25 is switched over so as to connect the $\overline{D}$ output of flip-flop 24 to the enable control line 15, instead of converter 22. The level of the enable control line 15 thus continuously remains 1, so that after the interval T the driver circuit 7 switches the laser diode 3 on and simultaneously operates the switch 10 so as to connect the driver circuit 11 of the optical amplifier 4 to the information signal input 8.

When the optical transmission cables 6 between the various transmitters 1 and receivers 2 are installed by hand one after the other, and if an optical connection is wired wrongly, the power of the spontaneous emission of the transmitter 1 which is optically connected to receiver 2 will generally be constant, and a non-agreement between the input signals of the NOR gate 21 occurs when the output signal from parallel-serial converter 22 changes its level for the first time. It is also conceivable that after a down-time of the switching station comprising the transmitters 1 and receivers 2, all optical connections are tested simultaneously, since it is not excluded that these have been modified during the down-time of the station. In that case, a plurality of test procedures occur simultaneously.

Figure 3:
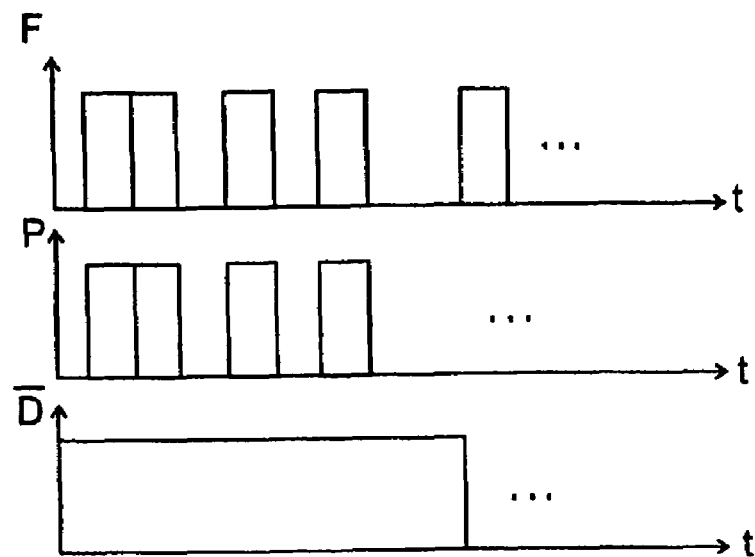
FIG. 3 illustrates the timing of signals on the enable control line, the waveguide and within the receiver of FIG. 2.

FIG. 3 shows an example for a possible timing of levels F of the enable signal line 15, levels P of the spontaneous emission on transmission cable 6 and of the $\overline{D}$ output signal of flip-flop 24. While the signal levels sent by receiver 2 on its enable control line 15 agree by chance with those which the transmitter, which is connected to it optically, receives from another receiver, the $\overline{D}$ output of flip-flop 24 remains at level 1; however, as soon as there is a difference in the levels (which is unavoidable if the data in register 23 of the receiver is unique for every receiver), the flip-flop 24 is set, the $\overline{D}$ output changes to 0, and the corresponding transmitter remains switched off when the test is finished.

In the simple embodiment of the invention considered here the transmitter 1 receives from receiver 2 a description of the shape of the test signal which it must generate in order to prove to the receiver 2 that it is indeed the transmitter 1 that is intended to be connected to it simply as a sequence of signal levels which the transmitter 1 only has to transform immediately upon arrival from electrical into optical form in order to obtain the test signal to be transmitted on the optical transmission cable 6. Evidently, instead of such a "direct" description of the test signal to be generated, any other appropriately coded form of a description may be used. This may be useful in particular if not every enable control line 15 is formed as an individual circuit line of the backplane but if the several enable control lines share such a circuit line in time multiplex. Such a solution may be indeed by desirable because the abandonment of a fixed wiring of the enable control lines allows for a more flexible association of receivers and transmitters. In case of such a solution, there is usually no more direct correspondence between the levels transmitted on the enable signal line 15 and the timing of the optical test signal generated by transmitter 1, and the description of the test signal transmitted on the enable control line 15 may be coded in any appropriate way.

Figure 4:
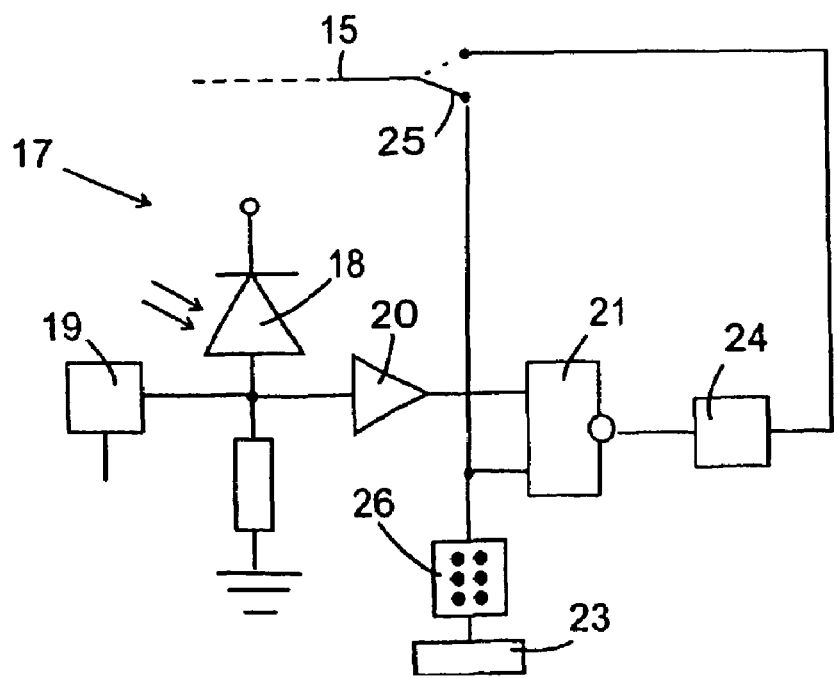
FIG. 4 illustrates a second embodiment of the receiver according to the invention.
Figure 5:
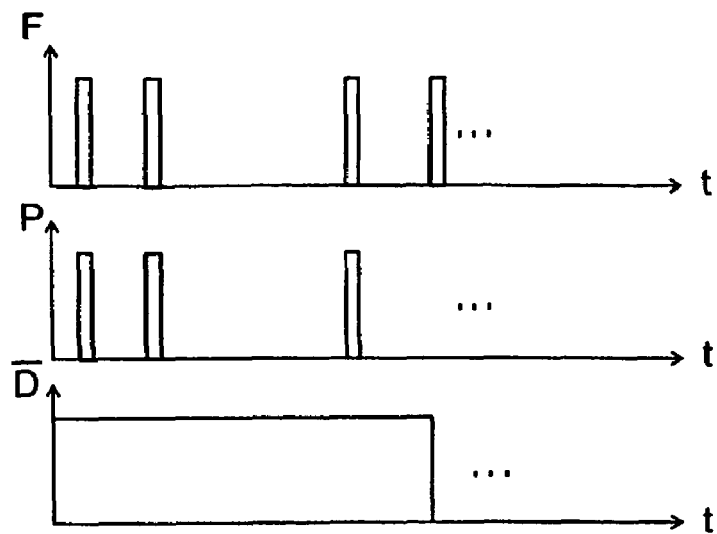
FIG. 5 illustrates the timing of signals on the enable control line, the waveguide and within the receiver of FIG. 4.

FIG. 4 shows a second embodiment of a receiver according to the invention. It is distinguished from the embodiment of FIG. 2 in that the parallel-serial converter is replaced by a pseudo-random generator 26 that generates, instead of the contents of register 23, a random number sequence and determines according to the generated numbers with a pre-defined low probability whether it provides a short impulse at its output or not. The advantage of this embodiment is that it can cooperate with a transmitter having a simpler structure than that shown in FIG. 1, that has no optical amplifier or in which the laser cannot be switched on and off independently from the amplifier. By making the impulses short enough and setting the probability of their generation low enough, the energy content of the impulse and the average power of the impulse signal delivered by a transmitter 1 may be made so low that in spite of the coherency of the impulses, a risk of eye injury can be excluded. The coincidence test shown schematically in FIG. 5 occurs in a similar way as in the case of FIG. 3; as soon as the optical test signal incident at the receiver 2 fails to contain an impulse specified by the random generator 26 (or if it contains an additional, unspecified impulse), the RS flip-flop 24 is set, and the optical connection between transmitter and receiver is identified as defective.

Figure 6:
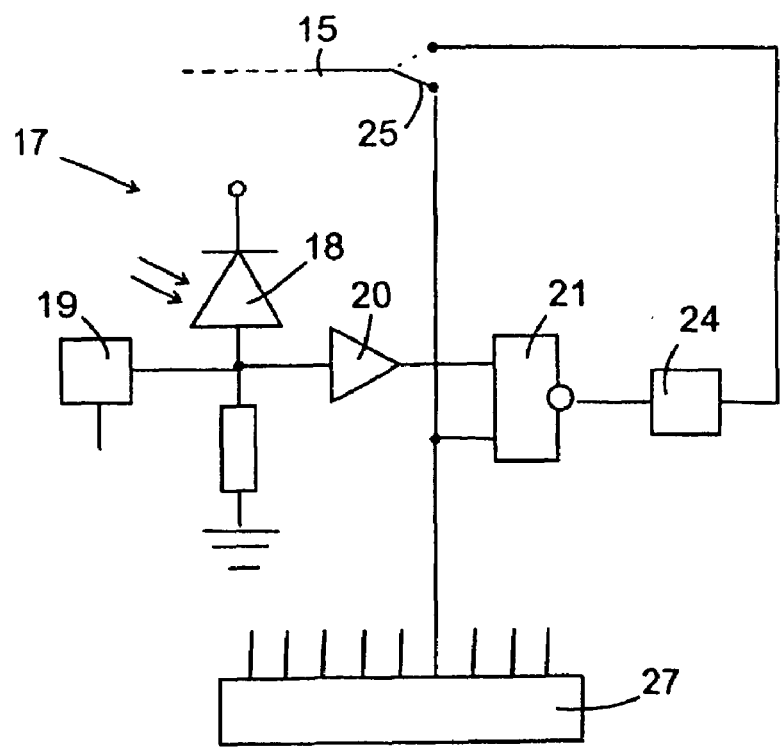
FIG. 6 a third embodiment of a receiver according to the invention.

In a third embodiment of the receiver shown in FIG. 6, the converter 22 and the register 23 are replaced by a control circuit 27 which is connected to all receivers 22 of the switching station and which, in case of a test of the optical transmission cables 6, receives from all receivers 2 that have to carry out a test, a request to grant such a test. The control signal 27 delivers these grants one after the other. Thus, it is guaranteed that at a given instant only one receiver of the station is testing whether the transmitter to which it is connected by the enable signal line is the one to which it is also connected optically. In that case, it is sufficient for the test signal description provided by the receiver to the transmitter to specify the instant of a single impulse. If this impulse is received in the test signal, the connection is correct, if the impulse is not received, it is defective.

The invention claimed is:

1. An optical information transmission system, comprising:
   a) a plurality of optical transmitters and optical receivers, each transmitter and receiver having ports for interchangeable waveguides, each transmitter having an enable input for receiving an enable signal associated therewith, each transmitter being operative for generating or not generating an optical information signal according to a status of the enable signal;
   b) a plurality of signal generators each operative for generating the enable signal associated with a respective receiver, the status of the enable signal indicating whether the respective receiver is or is not connected to a respective transmitter by a respective waveguide, each signal generator being connected to the enable input by an enable control line wired independently from the waveguides and being operative for generating the enable signal only if a test signal specific for the respective receiver has before been received at its respective waveguide port; and
   c) means for transmitting a description of the test signal of the respective receiver to the associated respective transmitter.

2. The optical information transmission system according to claim 1, wherein each receiver has a memory associated therewith for storing the description of the respective test signal.

3. The optical information transmission system according to claim 1, wherein each receiver has a random generator associated therewith for randomly generating the description of the respective test signal.

4. The optical information transmission system according to claim 1, and a central unit for assigning to each receiver the test signal description specific for that receiver.

5. The optical information transmission system according to claim 1, wherein the means for transmitting the description of the test signal is the enable control line.

6. The optical information transmission system according to claim 5, wherein the enable control line assumes two levels.

7. The optical information transmission system according to claim 5, wherein the test signal is described by a digital number.

8. The optical information transmission system according to claim 7, wherein each transmitter comprises an encoder for encoding the digital number into the test signal, and wherein each receiver has a decoder for extracting the digital number encoded in the test signal.

9. The optical information transmission system according to claim 1, wherein the test signal is described by at least one instant at which the test signal changes its level.

10. The optical information transmission system according to claim 1, wherein each transmitter transmits the test signal with a lower average power than the information signal.

11. The optical information transmission system according to claim 1, wherein each transmitter comprises a laser and an amplifier connected between the laser and the waveguide port of the transmitter, and wherein the laser is operable only in the presence of the enable signal.

12. The optical information transmission system according to claim 1, wherein the transmitters and the receivers are located on circuit boards mounted on a backplane, and wherein each enable control line extends along the backplane.

13. A method of suppressing unprotected emission of information signals from transmitters of an optical information processing system in which each transmitter is connected to an associated receiver by an enable control line so as to control enablement of the emission, and in which an optical waveguide is adapted to be connected between a respective transmitter and a respective receiver, comprising the steps of:
   a) outputting, by a respective transmitter, an optical test signal specific for an associated respective receiver;
   b) examining the test signal incident at the respective receiver; and
   c) if the test signal has arrived at the respective receiver, enabling transmission of the respective information signal;
   d) the steps a) to c) being performed when a respective waveguide has been detected as being connected to the respective receiver.

14. The method of claim 13, wherein the steps are performed in an initial operation phase of the system.

15. The method of claim 13, and the step of transmitting a description of the test signal beforehand from the respective receiver to the associated respective transmitter.

16. The method of claim 15, wherein the transmitting step is performed by transmitting a digital number as the description, and wherein the test signal is found to have arrived at the respective receiver if the same number is decoded in the test signal.

17. The method of claim 15, wherein the transmitting step is performed by transmitting the test signal having a level change at determined time intervals as the description, and wherein the test signal is found to have arrived at the respective receiver if, in the test signal, level changes are observed in the same time intervals.

18. The method of claim 13, wherein the information signal is coherent, and wherein the test signal is incoherent.

* * * * *